United States Patent [19]
Allen et al.

[11] Patent Number: 5,224,506
[45] Date of Patent: Jul. 6, 1993

[54] SKID MEMBER FOR A WALKER FRAME

[76] Inventors: Michael Allen, 841 Rosser Avenue, Brandon, Manitoba, Canada, R7A 0L1; Jim Clegg, P.O. Box 159, Miniota, Manitoba, Canada, R0M 1M0

[21] Appl. No.: 801,368

[22] Filed: Dec. 2, 1991

[51] Int. Cl.$^5$ .............................. A61H 3/00
[52] U.S. Cl. ........................ 135/67; 280/87.021; 403/260; 403/248; 135/77
[58] Field of Search .................... 135/65-68, 135/77, 84; 280/28, 28.14, 87.021, 87.051; 482/66, 68; 297/5-7; 403/260, 248, 249, 200

[56] References Cited

U.S. PATENT DOCUMENTS

| | | | |
|---|---|---|---|
| 1,943,807 | 1/1934 | Bellerive | 403/248 |
| 2,282,689 | 5/1942 | Ames | 135/67 X |
| 2,627,904 | 2/1953 | Thieman | 482/66 |
| 3,190,668 | 6/1965 | Hisak | 280/28.14 |
| 4,537,412 | 8/1985 | Hill | 280/28.14 X |
| 4,667,916 | 5/1987 | Richards | 403/260 X |
| 4,902,179 | 2/1990 | Harker | 403/248 X |

OTHER PUBLICATIONS

"Uni-Sled", Popular Mechanics Nov. 1960, p. 161.

Primary Examiner—Carl D. Friedman
Assistant Examiner—Lan M. Mai
Attorney, Agent, or Firm—Adrian D. Battison; Stanley G. Ade; Murray E. Thrift

[57] ABSTRACT

A walker frame of the type including four legs which extend into contact with the ground and support an upper handgrip portion is modified by the provision of a skid member attached to at least the rear legs for engagement with the ground. The skid member includes a portion of a flat strip material manufactured from a high density plastic material with the front edge of the skid member turned upwardly to allow ready sliding over various surfaces. The flat strip is attached to the lower leg by an insert member which expands in the hollow interior at the lower end of the leg by screws passing through the skid member from the underside into the leg.

5 Claims, 2 Drawing Sheets

SKID MEMBER FOR A WALKER FRAME

FIELD OF THE INVENTION

This invention relates to a walker of the type for assisting the walking of an enderly or infirm person and particularly to a skid member therefor which assists in the movement of the walker frame across the ground.

BACKGROUND OF THE INVENTION

Walker frames are well known and various designs and arrangements have been proposed for this function.

One simple inexpensive construction includes a frame having two side pieces each of which defines a pair of parallel depending legs so the legs terminate at a lower end for contact with the ground generally at the corners of a rectangle thus defining two forward or front legs and two rear legs. Each side frame portion defines a handgrip portion adjacent an upper part thereof so the hands of the person rest upon the upper part allowing the person to move the frame forwardly and then to step up to the frame to assist the walking of the person and to provide confidence to a person whose balance or musculature has deteriorated.

Often the simple device described above includes a pair of wheels each mounted on respective one of the front legs and a pair of rubber stoppers which are mounted each on respective one of the rear legs. The frame is therefore moved by skidding the rear legs across the ground while the front legs provide a rolling action. The rear legs also receive the weight of the user so the frame becomes stabilized by the friction or engagement between the rear legs and the ground.

Devices of this type have become well accepted and are widely successful in assisting the working of infirm patients. However there remains the opportunity for improvement of the device.

SUMMARY OF THE INVENTION

One aspect of the present invention, therefore, is to provide an improved walker frame.

According to a first aspect of the invention there is provided a walker for assisting the walking of an elderly or infirm person comprising a frame including an upper handgrip section for gripping by the hands of the person, four depending legs supporting a handgrip section including two front legs and two rear legs spaced generally at the corners of a rectangle, each of the rear legs having a skid member thereon, the skid member comprising substantially horizontal bar of a plastic material having an upturned front edge so that an underside surface of the skid member can slide readily across the ground.

According to a second aspect of the present invention there is provided a skid member for attachment to a tubular leg of a walker of a type for assisting the walking of an elderly or infirm person, the skid member comprising a bar formed of a flat strip with an upturned front edge to allow ready sliding action of an underside surface of the skid member across the ground, and expandable insert member for insertion into the tubular leg and means for expanding the insert member when positioned inside the tubular leg for engagement with an inside surface of the tubular leg.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
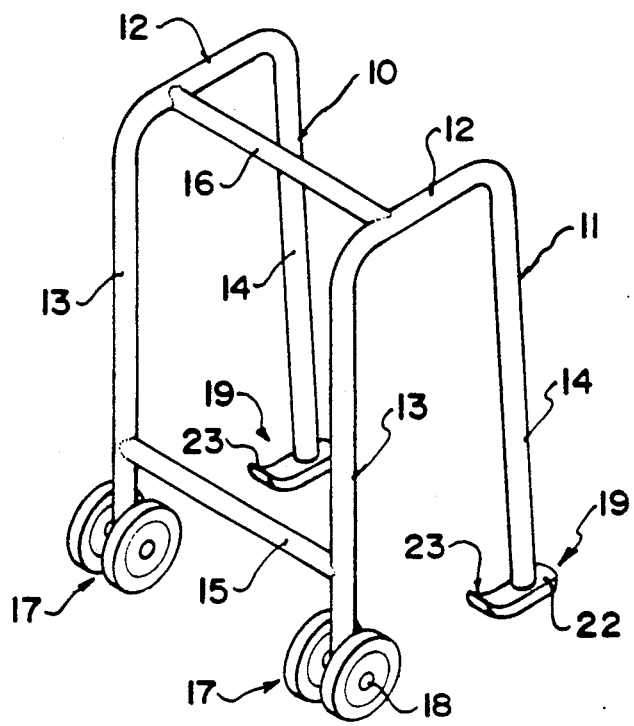
FIG. 1 is an isometric view of a walker according to the present invention.

A walker comprises a pair of side frame portions 10 and 11 each of which is generally U-shaped and inverted to define a horizontal handgrip portion 12, a depending front leg 13 and a depending rear leg 14. The side frame portions 10 and 11 are interconnected by horizontal beams 15 and 16 to form a rigid structure with the lower ends of the legs 13 and 14 arranged at the corners of a rectangle. Each of the front legs carries a ground wheel arrangement 17 which may comprise a pair of wheels mounted upon an axle 18 fixed to a lower front end of the respective leg 13 so as to transport the leg across the ground in a forward direction.

Figure 2:
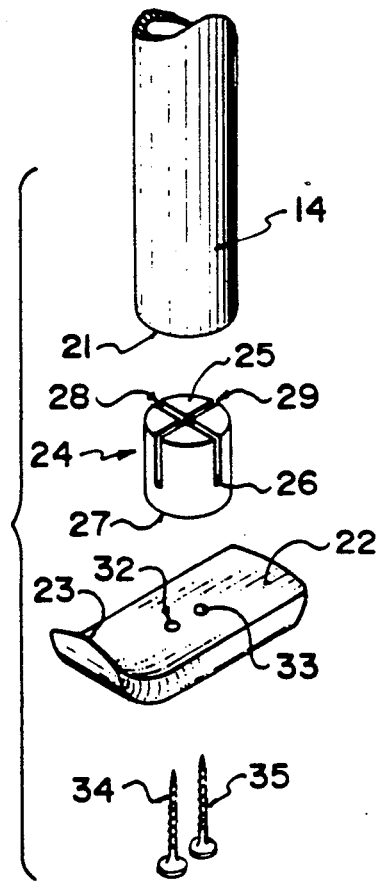
FIG. 2 is an exploded view of a lower part of one rear leg of the walker of FIG. 1 and including the pieces forming the skid member attached thereto.
Figure 3:
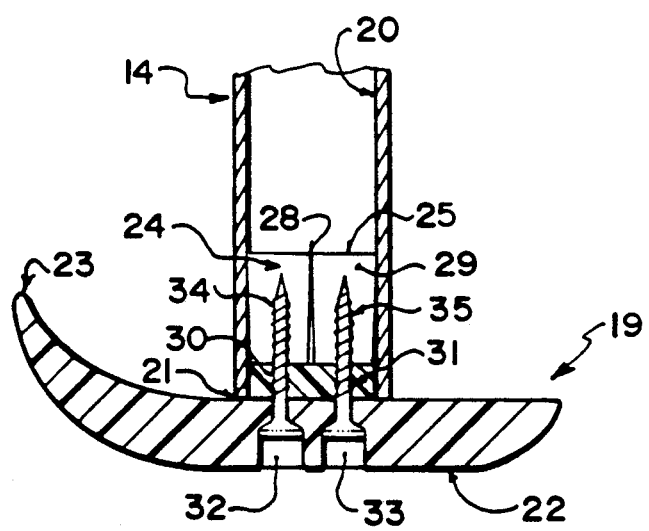
FIG. 3 is a transverse cross sectional view through the lower part of the leg of FIG. 1 including the skid member in attached position therein.
Figure 4:
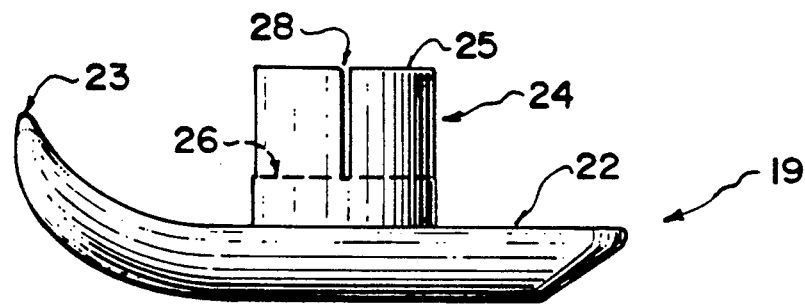
FIG. 4 is a side elevational view of the design of the skid member and insert.
Figure 5:
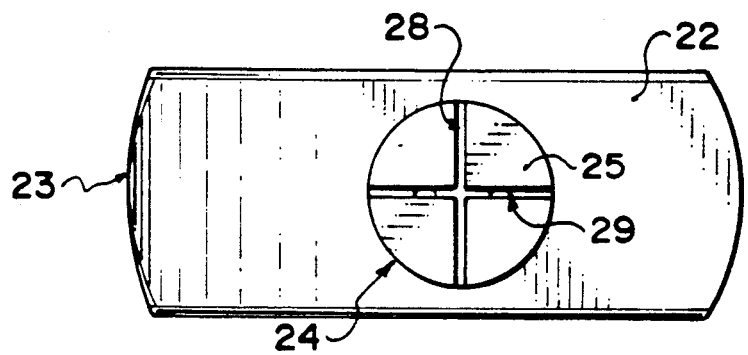
FIG. 5 is a top plan view of the embodiment shown in FIG. 4.
Figure 6:
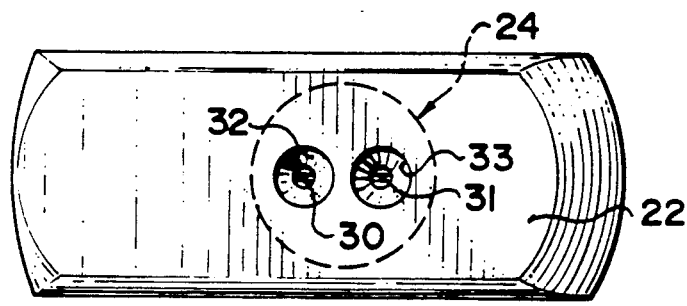
FIG. 6 is a bottom plan view of the embodiment shown in FIG. 4.
Figure 7:
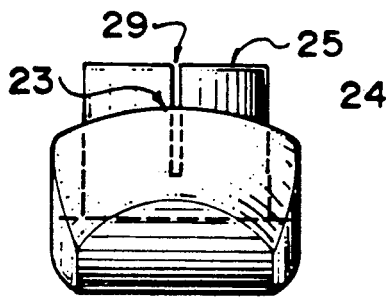
FIG. 7 is a front elevational view of the embodiment of FIG. 4.
Figure 8:
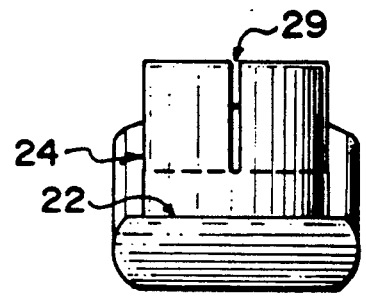
FIG. 8 is a rear elevational view of the embodiment shown in FIG. 4.

Each of the rear legs 14 includes at the lower end thereof a respective one of a pair of skid members 19 for resting upon the ground. The skid member is shown in more detail in FIGS. 2 and 3. Thus in FIG. 3 the lower end of the leg 14 is shown which is tubular so as to define a cylindrical hollow interior 20 and a circular open end face 21.

The skid member comprises a flat strip portion 22 which is cut from a length of the flat strip material to provide a width of the order of 1 to 1.5 inches and a length of the order of 3 inches. The flat strip material is formed of a suitable plastic material for example high molecular weight polyethelene with a thickness of the order of ¼ to ½ inch which is sufficient to provide rigidity for the skid member. A forward end 23 of the skid member is bent upwardly by a bending action subsequent to the cutting of the strip member to the required length so that the front portion is turned up permanently in a fixed position in a manner of a ski.

A separate insert member 24 comprises a cylindrical body of an outside circular diameter slightly less than the inside surface 20 of the leg so the insert member is a sliding fit therein. The insert is cut in two cut lines arranged at right angles and extending in axial planes along the cylindrical insert member from an upper end 25 to a position 26 spaced from a lower end 27 of the insert member. The cut lines are indicated at 28 and at 29 and thus divide that portion of the insert member along which the cut lines extend into four portions each forming a quadrant of a circle.

The insert member is drilled to form two holes 30 and 31 extending through the insert member from the end face 27 to a position intersecting the cut line 29. The flat strip member 22 also includes holes 32 and 33 extending from a countersunk end on the underside of the skid member through to an upper face of the skid member as shown best in FIG. 2.

The skid member is assembled onto the lower end of the leg 14 by insertion of the screws indicated at 34 and 35 into the holes 32 and 33 from the underside of the skid member to a position where it just projects beyond the upper surface of the skid member. The holes are then aligned with the holes in the underside 27 of the insert member and the screws are rotated to a position at which resistance is achieved by reaching the upper extent of the holes 30 and 31 at the slot line 29. The skid member and the attached insert member are then applied to the lower end of the leg 14 so the insert member projects into the open end 21 of the leg to a position where the upper surface of the skid member engages the open end of the leg. The screws are then rotated to force the ends of the screws into the slot line 29 to expand the parts of the insert member apart to engage the inside surface 20 of the leg as a friction fit. The skid members are rotated to take up a position facing forwardly towards the front leg 13 so that the upturned front end 23 faces in the direction of intended movement of the walker frame.

The skid member of the present invention has the advantage that it will glide smoothly over all surfaces for example a shag carpet, linoleum, cement and grass. The skid member is very simple to install as a retrofit in an existing walker of the type using a rubber plug for the rear leg. The skid member can be manufactured to fit all sizes in makes of walker frames which is generally of tubular material from which the frame is formed and is of a common diameter. In situations where a different diameter is used, the insert member can be simply replaced with an insert member of the required diameter. The skid member is light weight so does not significantly add to the weight of the walker frame. The skid member is formed from a high density plastic with a nylon insert.

The skid member can be used either on a wheel type walker frame as described above or the walker frame type which does not include any wheels but can use a skid member on each of the legs.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. A walker for assisting the walking of an elderly or infirm person comprising a frame including an upper handgrip section for gripping the hands of the person, four depending legs supporting a handgrip section including two generally parallel front legs and two generally parallel rear legs spaced rearwardly of the front legs, at least the rear legs being tubular so as to define a tubular hollow interior having an open lowermost end face, each of the rear legs having a skid member thereon, the skid member comprising substantially horizontal bar of a plastic material having an upturned front edge so that an underside surface of the skid member can slide readily across the ground, each of the skid members including an insert member engaged into the tubular hollow interior of the leg at the lowermost end face of the leg.

2. The walker according to claim 1 wherein the insert is expandable.

3. The walker according to claim 2 wherein the skid member includes two screws passing through the bar and engaging into a slot provided in the insert for expanding two parts of the insert away from the slot to engage the interior surface of the leg.

4. The walker according to claim 3 wherein the insert is separate from the bar.

5. The walker according to claim 1 wherein the bar is formed from flat strip which is cut to length and includes a front edge of the flat strip turned upwardly by bending to form said upturned front edge.

* * * * *